US010479568B2

(12) United States Patent
Kerstetter et al.

(10) Patent No.: US 10,479,568 B2
(45) Date of Patent: Nov. 19, 2019

(54) REUSABLE POURING SPOUT SYSTEM AND METHOD OF IMPROVING THE POURING AND STORAGE OF PARTICULATE MATERIAL HOUSED IN BULK PACKAGING

(71) Applicants: Lisa J. Kerstetter, University Place, WA (US); Tom E. Kerstetter, University Place, WA (US)

(72) Inventors: Lisa J. Kerstetter, University Place, WA (US); Tom E. Kerstetter, University Place, WA (US)

( * ) Notice: Subject to any disclaimer, the term of this patent is extended or adjusted under 35 U.S.C. 154(b) by 0 days.

(21) Appl. No.: 15/655,571

(22) Filed: Jul. 20, 2017

(65) Prior Publication Data

US 2018/0022513 A1 Jan. 25, 2018

Related U.S. Application Data

(60) Provisional application No. 62/364,695, filed on Jul. 20, 2016.

(51) Int. Cl.
B65D 47/12 (2006.01)
B65D 75/58 (2006.01)

(52) U.S. Cl.
CPC ....... B65D 47/122 (2013.01); B65D 75/5877 (2013.01); Y02W 30/807 (2015.05)

(58) Field of Classification Search
CPC .................................................. B65D 47/122
USPC ................ 222/567, 545, 562, 566, 105, 107
See application file for complete search history.

(56) References Cited

U.S. PATENT DOCUMENTS

| | | | | |
|---|---|---|---|---|
| 919,838 A * | 4/1909 | Eaton | ..................... | B65D 5/746 222/566 |
| 4,830,273 A * | 5/1989 | Kalberer | ................ | B65D 5/068 220/265 |
| 5,104,012 A * | 4/1992 | McAllister | .............. | F16N 37/00 222/528 |
| 6,755,325 B2 * | 6/2004 | Haase | .................. | B67D 1/0406 222/105 |
| 6,808,149 B1 * | 10/2004 | Sendowski | .............. | A47K 5/13 211/75 |
| 2003/0183663 A1 * | 10/2003 | Herman | ................. | B44D 3/128 222/570 |
| 2005/0133547 A1 * | 6/2005 | Swann | .............. | B05C 17/00516 222/566 |
| 2014/0001180 A1 * | 1/2014 | Gage | .................. | B65D 75/5872 220/62.12 |
| 2015/0183563 A1 * | 7/2015 | Luizzi | .................. | B65D 47/066 426/122 |
| 2018/0362812 A1 * | 12/2018 | Spies | .................... | C08F 220/18 |

* cited by examiner

Primary Examiner — Donnell A Long
(74) Attorney, Agent, or Firm — Christensen O'Connor Johnson and Kindness, PLLC

(57) ABSTRACT

A removable dispensing system for improving the extraction of pourable material from bulk packaging. The system includes a spout having an end with a flanged base and an end with a closure mechanism. The spout is connected to the bulk packaging with a two-sided adhesive element or coupler. The coupler attaches to the packaging and to the flanged base of the spout. The spout may be removed by hand and attached to a different package.

20 Claims, 4 Drawing Sheets

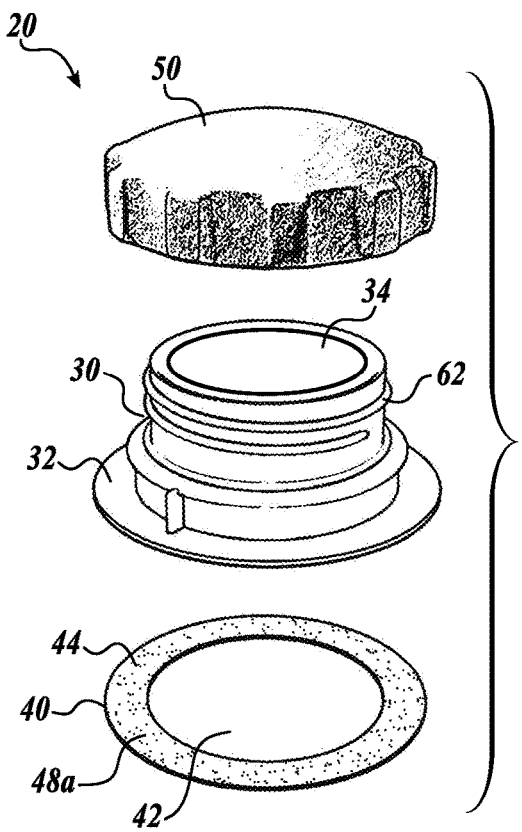
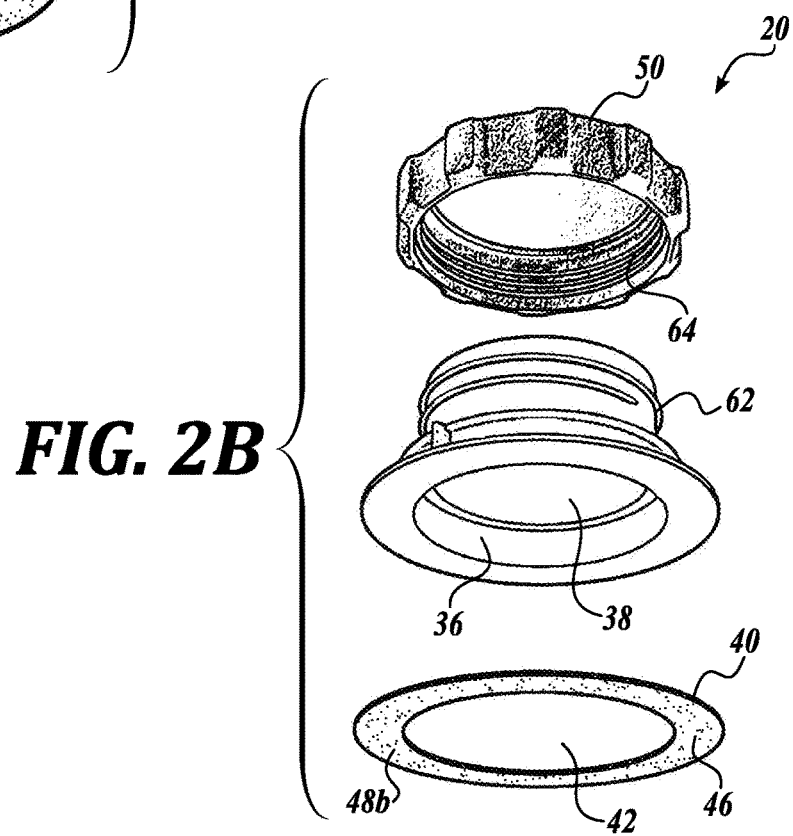
*FIG. 2A*
*FIG. 2B*

REUSABLE POURING SPOUT SYSTEM AND METHOD OF IMPROVING THE POURING AND STORAGE OF PARTICULATE MATERIAL HOUSED IN BULK PACKAGING

CROSS-REFERENCE TO RELATED APPLICATION

This application claims the benefit of U.S. Provisional Application No. 62/364,695, filed Jul. 20, 2016, which is hereby incorporated in its entirety.

BACKGROUND

Many products are distributed in bags and bulk packaging formed of paper, plastic or other substrates. Bulk packaging containing solid dry particulate or liquids must often be permanently opened. For example, some bags or boxes must be cut or torn open in order to pour out the product they contain. Others may include an integrated closable pouring region—usually along the top of the packaging. In either case, the packaging is designed with a one-use seal. Once opened, the package cannot be resealed. Often it is desirable to remove only a portion of the contents for immediate use. The remainder must then be disposed of, allowed to sit unsealed, or transferred to secondary storage containers that occupy substantial storage space.

SUMMARY

Embodiments of the present disclosure aim to address the problem of single-use containers and reducing waste or the need for secondary storage containers. As will be described in more detail below, the disclosed technology is directed to methods and apparatus for a reusable, sealable dispensing system that may be attached to bulk packaging via an adhesive element or coupler.

The dispensing system includes a spout. The spout in some embodiments includes a flanged end configured to attach to a two-sided coupler covered with an adhesive selected to make the spout removable by hand. When the package has been emptied, the spout may be removed and attached to a new package or container with a new adhesive element or coupler.

The spout also has an end designed to be closed and/or sealed shut when not in use. Various mechanisms for closing and/or sealing the end are contemplated, as are differing cross-sectional shapes for the spout. To pour the contents of the packaging, a hole is created, formed, cut or otherwise provided in the packaging container. Creation of a hole is considered at various points during the spout connection process. When attached to bulk packaging, the system creates a reusable and optionally resealable, space-efficient storage solution.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIGS. 2A and 2B are top and bottom exploded views of the reusable dispensing system of FIG. 1;

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
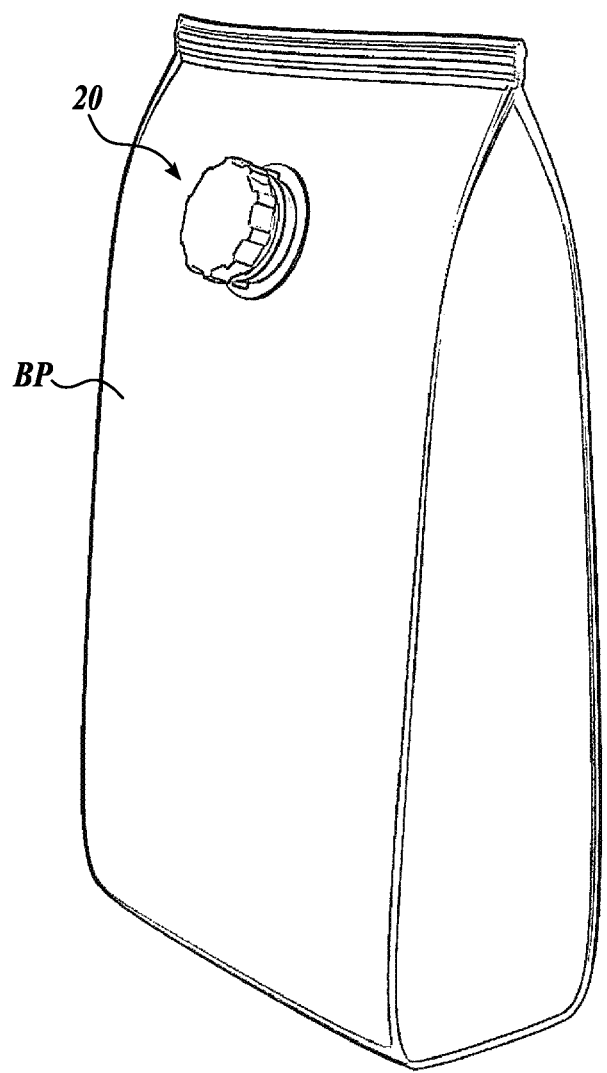
FIG. 1 is a perspective view of a representative embodiment of a reusable dispensing system in accordance with an aspect of the present disclosure, wherein the reusable dispensing system is coupled to a bulk packaging container.

Turning now to FIG. 1, there is shown a representative embodiment of a reusable dispensing system, generally designated 20, formed in accordance with an aspect of the present disclosure. As shown in FIG. 1, the reusable dispensing system 20 is suitable for use with a bulk packaging container BP. As will be appreciated by the following disclosure, the reusable dispensing system 20 is suitable for use by a consumer to assist in dispensing or pouring a solid dry particulate product contained in the bulk packaging container BP while maintaining the freshness of the product and minimizing spillage. Products include, but are not limited to animal food, fertilizers, chemicals, and other dry, solid particulate material suitable for being housed in a bag or other bulk packaging, etc.

FIGS. 2A and 2B are exploded views of a representative embodiment of the reusable dispensing system 20. As shown in FIG. 2, the reusable dispensing system 20 comprises a spout 30, a coupler 40 configured to detachably connect the spout 30 to the bulk packaging container BP, and a closure or cap 50. Of course, in some embodiments, the coupler can be configured to couple the spout 30 to the bulk packaging container BP in a more permanent manner for single use purposes.

In the embodiment shown, the spout 30 includes a body with circular cross section and a flanged base 32. However, it will be appreciated that other geometries, such as ovaloid or rectangular cross-sections, may be practiced with embodiments of the present disclosure. In each case, the spout 30 defines openings 34, 36 at its upper and lower ends, respectively. The openings 34, 36 are interconnected via conduit 38.

The spout 30 is formed from either petro-based or bio-based plastics that have been approved for food contact by the FDA, but alternatives such as steel, aluminum, or any other material suitable for contact with the items contained in bulk packaging may be used. In some embodiments, the spout can include materials, such as polylactic acid (PLA), bio-derived polyethylene, cellulose acetate, polyethylene terephthalate (PET), polypropylene (PP), High-Density Polyethylene (HDPE), Low-Density Polyethylene (LDPE), and polycarbonate (PC).

As briefly stated above, the spout 30 is attached to the bulk packaging container BP via the coupler 40. The coupler 40 in some embodiments is shaped and sized to match the outward facing surface of the flange 32. In the embodiment shown, the coupler 40 is formed as a ring. The inner hole 42 defined by the ring is sized and configured to cooperate with the lower opening 36 of the spout 30. The coupler 40 is made from a suitable material, such as rubber, a polymer foam, or plastic, to name just a few. In some embodiments, the top and bottom surfaces 44 and 48 of the coupler 40 or section thereof are coated with an adhesive 48. In other embodiments, the coupler 40 may additionally or alternatively have inherently adhesive properties. In some embodiments, the adhesive is selected from a class of removable adhesives. In some embodiments, the removable adhesive is R3500 removable acrylic adhesive sold by 3M™. In some embodiments, the coupler is formed out of a removable adhesive putty, such as Blu-Tack™, a removable acrylic adhesive double-sided adhesive tape, etc. In some embodiments, the surfaces of the coupler include backing paper that is removed prior to use.

Figure 3:
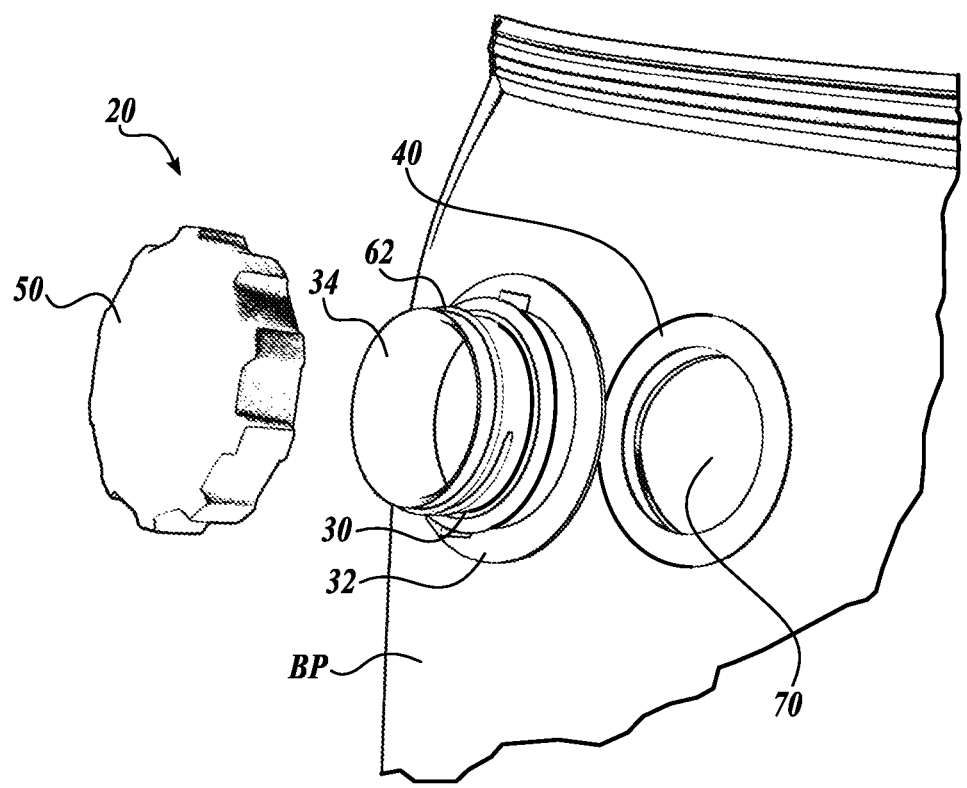
FIG. 3 is an exploded view of the dispensing system of FIG. 2 connected to the bulk packaging container.
Figure 4A:
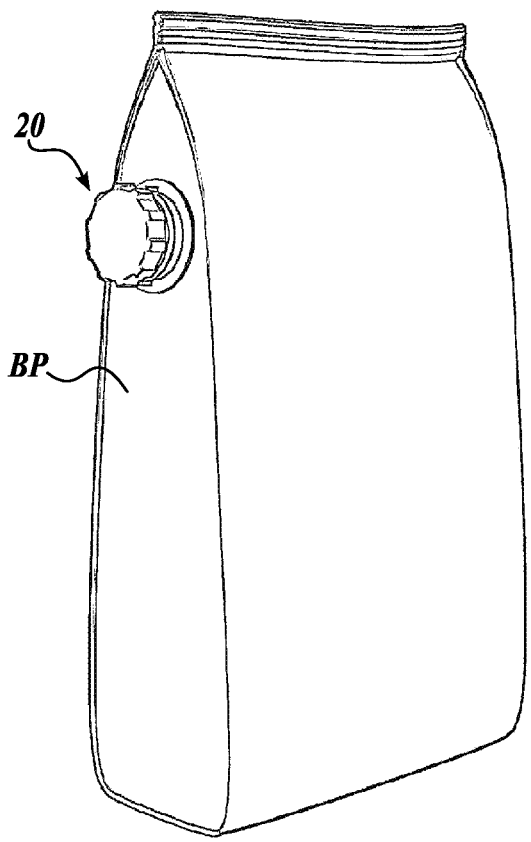
FIGS. 4A and 4B are perspective views of reusable dispensing systems coupled to bulk packaging containers at different locations.
Figure 4B:
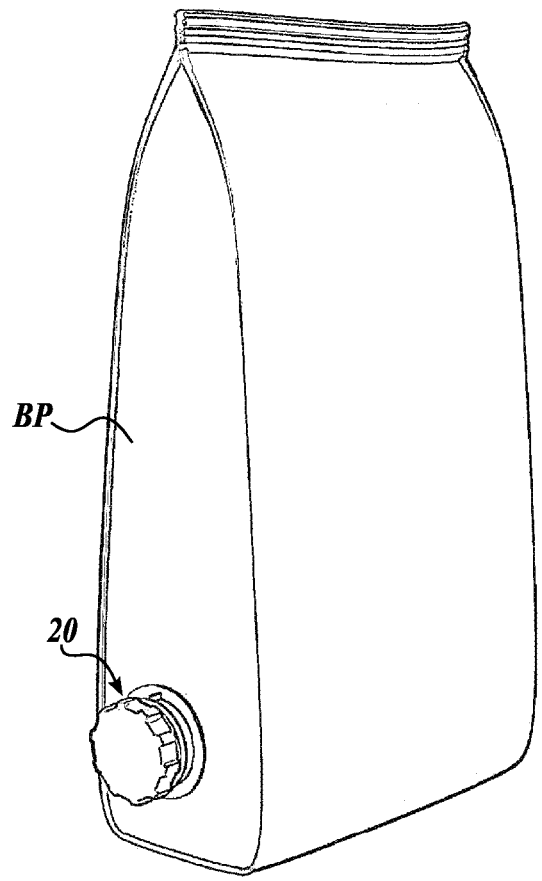

Turning now to FIG. 3, the spout 30 is connected to the bulk packaging container BP by the coupler 40. When ready for use, one side of the coupler 40 is attached to the flanged base 32 of spout 30 via adhesive 48a and the other side of the coupler 40 is attached via adhesive 48b to the bulk packaging container BP. The adhesive 48a connecting spout 30 to the coupler 40 is selected such that spout 30 may be removed from the bulk packaging container BP by hand. After spout 30 has been removed, a new bulk packaging container may be selected, and a new coupler 40 can be employed to attach the spout 30 to the new bulk packaging container for continued use. In some embodiments the same adhesive material is used on both the spout and package sides of the coupler 40. In other embodiments, different adhesives with different adhesive properties are used to connect to the spout and the package.

Various forms of closing and/or sealing the spout 30 once connected to the bulk packaging container BP are contemplated for practice with embodiments of the present disclosure. In one embodiment, the end of the spout 30 opposite the flanged base 32 includes external threads 62, which are configured to cooperatively connect with internal threads 64 of the cap 50. As such, the cap 50 and threads 62, 64 combine to form one embodiment of a closure mechanism. Other embodiments of closure mechanisms are contemplated to be practiced with embodiments of the present disclosure. For example, a closure mechanism can be provided that comprises a spout with internal threads and a threaded plug. To close the spout, the plug is inserted into the opening of the spout and tightened. In other embodiment, a closure mechanism composed of only a plug to be inserted into the end of the spout can be utilized. The plug in this embodiment can be made of a material such as rubber, plastic, metal, or any other material suitable for forming a seal and a fiction fit with the opening of the spout. In other embodiments, a closure mechanism is formed by a cap with a lip or other form of internal ridge that snaps onto (or over, or into) the end of the spout.

A method for assembling the reusable dispensing system 20 onto the bulk packaging container BP will now be described with reference to FIGS. 1, 2A-2B, and 3. It will be appreciated that the order in which the elements of the reusable dispensing system 20 are attached may vary.

Returning to FIG. 3, the coupling 30 may initially be attached to either the spout 30 or the bulk packaging container BP before being used to mate the two. In the embodiment shown in FIG. 3, the coupler 40 is first attached to the bulk packaging container BP via adhesive 42b. If the coupler 40 is first attached to the bulk packaging container BP it may be used as a guide or template to assist users in the creation of a hole 70.

For example, hole 70 is to be made in the bulk packaging container BP before the contents of the bulk packaging container BP may be extracted through the spout 30. In some embodiments, the hole can be cut out via utility knife or other sharp bladed device. The hole 70 may be made before the coupler 40 is attached to the bulk packaging container BP, after the coupler 40 is attached to the bulk packaging container BP but before the spout 30 is attached to the coupler 40, or after both the coupler 40 and spout 30 have been attached to the bulk packaging container BP.

In the embodiment shown in FIG. 3, the coupler 40 is first attached to the bulk packaging container BP and then the hole 70 is formed in the bulk packaging container BP. Next, the base flange 32 of the spout 30 is aligned with and pressed down against the coupler 40, affixing the spout 30 to the bulk packaging container BP. Once attached, the spout 30 can be used to selectively empty the contents of the bulk packaging container BP. Cap 50 can be used to close and seal the bulk packaging container BP between uses.

After the bulk packaging container BP has been emptied, the spout 30 may be removed by hand. In one embodiment, the spout 30 separates from the coupler 40 when pulled therefrom while the coupler 40 remains attached to the now-empty packaging container. A new coupler 40 may then be used to attach the spout 30 to a new bulk packaging container.

Various forms of bulk packaging containers are suitable for use with the removable spout. For example, the bulk packaging containers include without limitation: boxes, bags, or other means of storing solid particulate or liquid goods. The containers may be made of pulp, paper, plastic, metal, or other materials typical of bulk storage.

The disclosed reusable dispensing system eliminates the need to tear open a bag or packaged product, provides a convenient solution to reseal the package, and precludes the need for secondary storage containers. All the user needs to do is remove the cap and pour the material from the bulk packaging or bag through the pouring spout of the flanged base after the reusable pouring spout is attached in the manner described above. Due to the uniquely tested and identified adhesion properties of the adhesive ring, the flanged based is simply and easily removed by hand once the once the bulk contents have been depleted. The flange base is then ready to be reused in conjunction with a new coupler.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A reusable dispensing system, comprising:
   a reusable spout having an end configured for attaching to a first container, the end including a flanged base;
   a solid coupler having a flanged base facing surface and a container facing surface, the coupler further having an opening that extends between the flanged base facing surface and the container facing surface, the coupler including a first adhesive on the flanged base facing surface and a second adhesive on the container facing surface, the first adhesive being configured to attach to the flanged base and the second adhesive being configured for attachment to the container; and
   a cap configured to seal an end of the reusable spout,
   wherein the first adhesive is configured so that the reusable spout is removable from the first container by a hand of a user and thereafter attached to a second container.

2. The system of claim 1, wherein the coupler is a polymeric ring having an outer perimeter that is sized to not exceed an outer perimeter of the flanged base when the coupler is attached to the flanged base.

3. The system of claim 2 wherein the cross-section of the spout is circular.

4. The system of claim 1, wherein the cap is a threaded cap and the spout has threads configured to mate with the threaded cap.

5. The system of claim 1, wherein the coupler includes a two-sided adhesive tape.

6. The apparatus of claim 1, wherein the coupler includes a polymeric band having adhesive on opposing sides.

7. The apparatus of claim 1, wherein the coupler includes an adhesive putty.

8. A method for using a reusable dispensing system with a bulk packaging container having a number of walls defining a sealed cavity containing contents, the system including a reusable spout and a coupler separate from the spout and having a first adhesive side and an opposite, second adhesive side, the method comprising:
   attaching the first adhesive side of the coupler to any location along a continuous surface of a first wall of the number of walls of the bulk packaging container;
   attaching the second adhesive side of the coupler to a base of the spout, the second adhesive side being configured so that the spout is removable from the bulk packaging container by a hand of a user;
   creating a hole in the first wall of the bulk packaging container after the coupler is attached to the continuous surface of the bulk packaging container, wherein the hole is arranged to provide communication between an outlet of the spout and the sealed cavity of the bulk packaging container to allow for the contents to exit the bulk packaging container through the hole and the outlet of the spout.

9. The method of claim 8, wherein the hole in the bulk packaging container is created after the attachment of the spout.

10. The method of claim 9, wherein the spout is used as a guide to create the hole with a sharp edged object that is discrete from the spout and the coupler.

11. The method of claim 8, wherein the second adhesive side of the coupler is attached to the bulk packaging container before the first side of the coupler is attached the spout.

12. The method of claim 11, wherein the hole in the bulk packaging container is created with a sharp edged object that is discrete from the spout and the coupler after the coupler is attached to the bulk packaging container, and before the spout is attached to the coupler.

13. The method of claim 12,
   wherein the hole is created by cutting the hole in the bulk packaging container with the sharp edged object using a hole in the coupler as a guide.

14. The method of claim 8, further comprising:
   removing the spout from the coupler that connects the spout to the bulk packaging container.

15. The method of claim 8, wherein the bulk packaging container is a bag.

16. The method of claim 15, wherein the contents of the bulk packaging container includes dry goods.

17. The method of claim 8, wherein the hole in the bulk packaging container is created with a knife that is discrete from the spout and the coupler.

18. The method of claim 8, further comprising:
   removing the spout from the bulk packaging container by the hand of the user;
   obtaining a second coupler having a first adhesive side and an opposite, second adhesive side; and
   attaching the spout via the second coupler to a second bulk packaging container containing contents.

19. The method of claim 18, wherein said removing the spout from the bulk packaging container includes
   removing the spout from the bulk packaging container by the hand of the user after the bulk packaging container has been emptied.

20. A method for using a reusable dispensing system with a plurality of bulk packaging containers, the system including a spout and a coupler separate from the spout and having first and second opposite sides having first and second adhesives disposed thereon, respectively, the method comprising:
   obtaining a first bulk packaging container having a number of continuous walls defining a sealed cavity containing dry particulate product;
   attaching the first side of the coupler via the first adhesive to along a first continuous wall of the number of continuous walls;
   attaching the second side of the coupler via the second adhesive to a base of the spout, the second adhesive being configured so that the spout may be removed from the bulk packaging container by a hand of a user;
   creating a hole in the first continuous wall after the coupler is attached to the first continuous wall of the bulk packaging container;
   and after the dry particulate product has been depleted, removing the spout from the bulk packaging container by the hand of the user;
   obtaining a second coupler with first and second opposite sides having first and second adhesives disposed thereon; and attaching the spout via the second coupler to a second bulk packaging container defining a sealed cavity containing dry particulate product.

\* \* \* \*